United States Patent
Cray et al.

(10) Patent No.: US 7,613,075 B2
(45) Date of Patent: Nov. 3, 2009

(54) ADAPTIVE HIGH FREQUENCY LASER SONAR SYSTEM

(75) Inventors: Benjamin A. Cray, West Kingston, RI (US); Walter H. Boober, Newport, RI (US); Stephen E. Forsythe, Portsmouth, RI (US); Lee E. Estes, Mattapoisett, MA (US); Andrew J. Hull, Portsmouth, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 115 days.

(21) Appl. No.: 11/761,536

(22) Filed: Jun. 12, 2007

(65) Prior Publication Data

US 2008/0310256 A1    Dec. 18, 2008

(51) Int. Cl.
*H04R 1/44* (2006.01)
(52) U.S. Cl. ....................................................... 367/149
(58) Field of Classification Search ................. 367/149, 367/162, 176
See application file for complete search history.

(56) References Cited

U.S. PATENT DOCUMENTS

| | | | | |
|---|---|---|---|---|
| 4,155,065 A | * | 5/1979 | Stimler | ....................... 367/149 |
| 4,446,543 A | * | 5/1984 | McLandrich et al. | ........ 349/149 |
| 6,188,644 B1 | | 2/2001 | Walsh et al. | |
| 6,349,791 B1 | | 2/2002 | Glenning et al. | |
| 2002/0149998 A1 | * | 10/2002 | Hoover | ....................... 367/189 |

OTHER PUBLICATIONS

Benjamin A. Cray, Stephen E. Forsythe, Andrew J. Hull and Lee E. Estes, A Scanning Laser Doppler Vibrometer Acoustic Array, paper, Jul. 2006, pp. 164-170, vol. 120, No. 1, Journal Acoustic Society of America, USA.

* cited by examiner

*Primary Examiner*—Ian J Lobo
(74) *Attorney, Agent, or Firm*—James M. Kasischke; Michael P. Stanley; Jean-Paul A. Nasser

(57) ABSTRACT

An acoustic sensing device includes a housing having an internal cavity filled with a vibration decoupling medium. An acoustic window formed of an acoustically transparent material is mounted in the housing. This mounting can be by antivibration mounts to prevent housing noise from affecting the acoustic window. A scanning laser vibrometer is positioned within the housing and directed to detect vibrations of the acoustic window. Antivibration mounts are joined between said scanning laser vibrometer and said housing. In further embodiments, the scanning laser vibrometer detects vibrations at a plurality of locations on the acoustic window forming a virtual array.

9 Claims, 3 Drawing Sheets

ADAPTIVE HIGH FREQUENCY LASER SONAR SYSTEM

STATEMENT OF GOVERNMENT INTEREST

The invention described herein may be manufactured and used by or for the Government of the United States of America for Governmental purposes without the payment of any royalties thereon or therefore.

CROSS-REFERENCE TO RELATED PATENT APPLICATIONS

None.

BACKGROUND OF THE INVENTION (1) Field of the Invention

The present invention relates generally to acoustic sensors, and in particular to a laser vibrometer acoustic sensor for use in underwater applications.

(2) Description of the Prior Art

Sonar systems traditionally use an array of pressure-sensing hydrophones to detect underwater sound. The individual hydrophones (or array elements) are configured in a linear, planar, or conformal grid and then the output voltage from each hydrophone is summed. Fundamentally, the hydrophone converts the underwater acoustic pressure to a calibrated voltage. Array sampling theory requires that the separation between the array elements be no greater than one half the acoustic wavelength at the array's upper design frequency.

Pressure sensors, or hydrophones, are commonly used in these acoustic arrays. These sensors are made of piezoelectric ceramic materials which convert mechanical stresses in the ceramic due to an incident acoustic pressure into a calibrated output voltage. More recently, acoustic velocity sensors have been used in acoustic arrays. These velocity sensors also use ceramic's piezoelectric properties to convert acoustic particle velocity to an output voltage. Thus, the acoustic frequencies utilized by the array are limited by the sensor spacing Scanning laser vibrometers are well known in the prior art. These include commercially available systems such as the Polytec® Model PSV-100 Scanning Laser Vibrometer System (SLVS). This system can sample a grid of 512 by 512 points, with each grid point having a spot size of 0.0004 inches. The output of the SLVS provides an indication of the velocities of an object at the grid points to indicate vibrations of the object.

It has previously been proposed to use this technology for underwater acoustic detection.

Walsh et al. in U.S. Pat. No. 6,188,644 teach a photon transducer system is provided for obtaining information on acoustic signals within a fluid environment. The photon transducer system uses a laser-based Doppler interferometer located within a pressure release surface. The pressure release surface is formed by generating a gas pocket in the fluid, creating a boundary layer between the laser light source and the surrounding fluid. Laser light is reflected from the boundary and is detected by the interferometer to obtain the Doppler velocity of the pressure release surface. The pressure incident on the boundary can be determined from the measured velocity, providing information on the incident acoustic pressure.

Glenning et al. in U.S. Pat. No. 6,349,791 teach a submarine bow dome acoustic sensor assembly that comprises an outer hull bow portion, an inner pressure hull wall extending athwartships and in conjunction with the outer hull bow portion defining a free-flood compartment, and an acoustic bow panel disposed in the compartment and connected to the pressure hull wall by acoustically isolating supports. A laser scanner is disposed in the compartment and is oriented so as to project a laser beam onto a surface of the acoustic bow panel, and a sensor is disposed in the compartment and oriented so as to receive reflections of the laser beam off the acoustic panel and to transmit data from which a position of a sound generating source can be determined.

Antonelli et al. in U.S. patent application Ser. No. 11/070,400 teach an acoustic sensor used in underwater applications. The sensor includes a reflective material adhered to one side of a structure, such as an outer submarine hull or any marine vessel hull. A laser interferometer is placed on the side of the structure with the reflective material. The laser interferometer sends a plurality of laser beams, in sequence or all at one time, to a plurality of points across the retro-reflective material. The laser beams reflect back to the interferometer, which captures the reflected beams using receiving optics. The phase modulation of the reflected laser beams is compared to a reference laser beam within the interferometer to obtain the vibration velocity characteristics of the hull surface structure. Since the reflective material is adhered to the structure, the structure vibration is the same as the vibration of the reflective material. From this vibration, the acoustic pressure associated with the structure may be calculated.

Walsh et al. provide for measurement of characteristics of a pressure release surface on the exterior of an underwater vehicle. It is suggested that various characteristics of the disclosed system make it unsuitable for use as an underwater acoustic sensor. The laser interferometer is not capable of scanning the boundary surface to conduct beamforming. The boundary surface is not sufficiently stable to clearly determine acoustic vibrations. Furthermore, the laser interferometer is not insulated from vehicle vibrations.

Glenning et al. use a scanning laser for measurement of vibrations impinging on a bow panel located in a free flood area of an underwater vehicle. During a test of a similar system, it was found that at oblique angles, the incident sound field insonified both the panel and the acoustic lens of the underwater housing containing the laser. This distorted the time series measurements made on the surface of the panel. It was also found that water particles in the path of the laser were insonified further distorting the acoustic waves.

Antonelli et al. disclose an air/water acoustic window, but they don't disclose the use of vibration isolation for the window and the laser vibrometer. As above, it has been found that this lack of isolation interferes with the reception of external acoustic signals.

In view of the prior art, there is a need for an acoustic sensor system that does not have the limitations imposed by prior art ceramic devices. There is a further need for a sensor that is isolated from structure borne noise and capable of receiving undistorted acoustic signals from normal and oblique acoustic sources.

SUMMARY OF THE INVENTION

The adaptive high frequency laser sonar system includes a housing having an internal cavity filled with a vibration decoupling medium. An acoustic window formed of an acoustically transparent material is mounted in the housing. This mounting can be by antivibration mounts to prevent housing noise from affecting the acoustic window. A scanning laser vibrometer is positioned within the housing and directed to detect vibrations of the acoustic window. Antivibration mounts are joined between said scanning laser vibrometer and the housing. In further embodiments, the scanning laser vibrometer detects vibrations at a plurality of locations on the acoustic window forming a virtual array.

In operation, the scanning laser vibrometer scans the surface of the acoustic window to detect its surface velocity which is directly proportional to the incident acoustic pressure. This sampling creates essentially a continuous acoustic aperture—the upper cut-off frequency for such a finely sampled array would be 74 MHz. Acoustic grating lobes would be eliminated at all frequencies of practical interest.

BRIEF DESCRIPTION OF THE DRAWINGS

The foregoing invention will become readily apparent by referring to the following detailed description and the appended drawings in which.

DETAIL DESCRIPTION OF THE INVENTION

In its simplest form, Euler's equation for a propagating harmonic plane wave reduces to $$p(x,t) = \rho c v(x,t), \tag{1}$$

where $p(x,t)$ is acoustic pressure and $\rho c v(x,t)$ is the product of the medium's characteristic impedance $\rho c$ and acoustic particle velocity $v(x,t)$. Thus, measuring acoustic pressure with an array of conventional hydrophones is equivalent to measuring acoustic particle velocity with an array of velocity sensors. This equivalence has been the basis for sonobuoy designs for decades and, more recently, for innovative submarine sonar systems.

Figure 1:
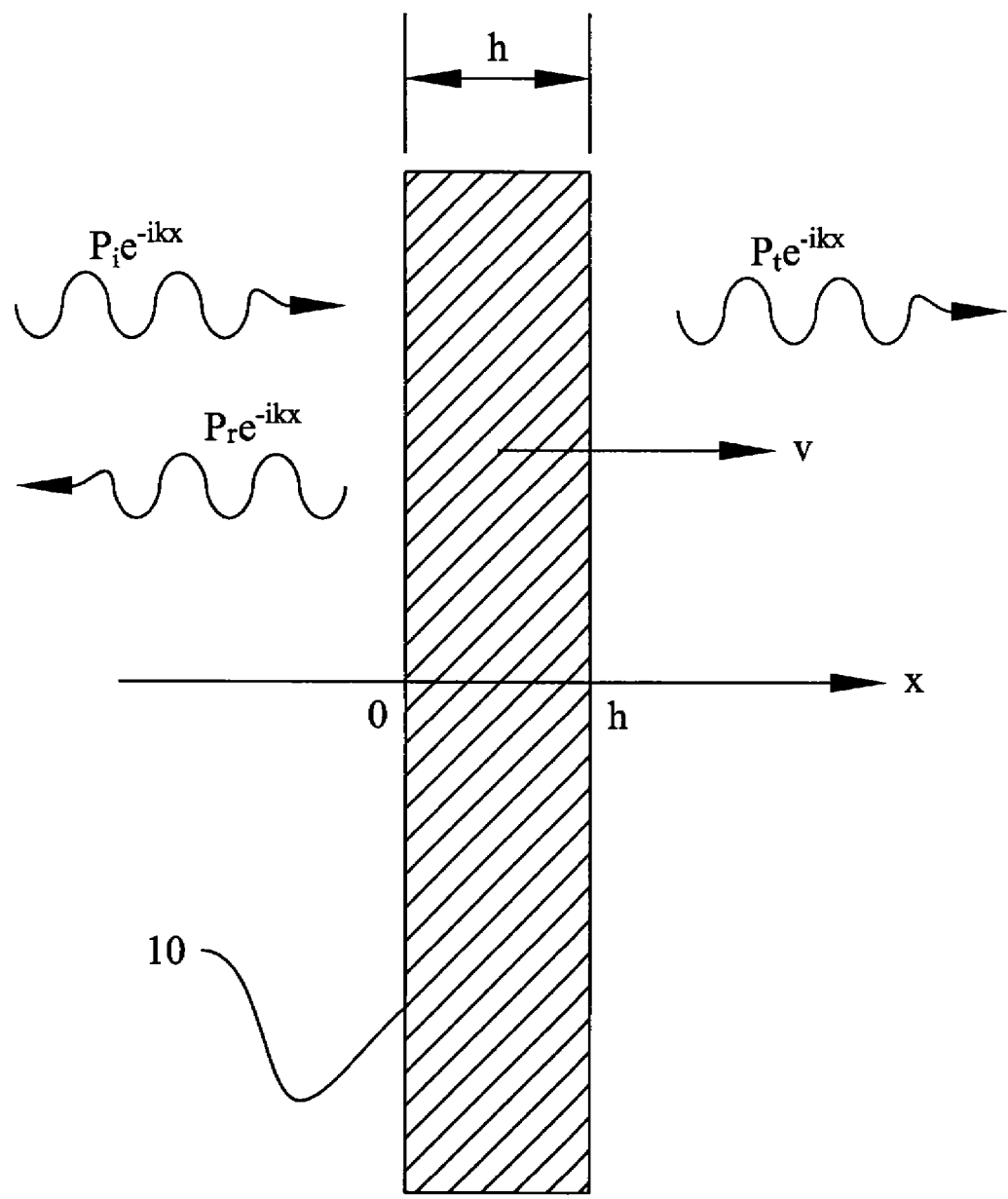
FIG. 1 is a diagram showing acoustic pressure waves impinging on a thin plate in a fluid.

Referring now to FIG. 1, consider a thin plate (or membrane) of thickness h, insonified by an acoustic plane wave of amplitude $P_i$ as seen in FIG. 1, with reflected and transmitted amplitudes, $P_r$ and $P_t$, respectively. The plate is thin relative to the incident acoustic wavelength, that is, kh<<1, where k is the acoustic wave number, and the harmonic time dependency is ignored. Given this, the plate's velocity can be assumed constant throughout the plate, v(0,t)=v(h,t) Applying Euler's equation to both surfaces of the plate gives $$\frac{p_i - p_r}{\rho c} = v = \frac{p_t}{\rho c}. \tag{2}$$

The amplitude of the plate's velocity is V=|v|. A force balance between each plate boundary yields $$(P_i + P_r)A = F(0), \tag{3}$$

$$P_t A = F(h), \text{ and} \tag{4}$$

$$F(0) - F(h) = i\omega \rho_1 h A V = (P_i + P_r)A - P_t A. \tag{5}$$

where A is a unit surface area, $\rho_i$ is the plate's density, and i is $\sqrt{-1}$. Combining equations (2) and (5) yields the incident pressure to window velocity transfer function, $$\frac{P_i}{V} = \rho c + i\omega \rho_i \left(\frac{h}{2}\right), \tag{6}$$

where $\omega$ is the angular frequency of harmonic excitation. Note that as h→0, equation (6) reduces to Euler's equation, $P_i = \rho c V$, and the plate's velocity is directly proportional to the incident acoustic pressure. This is, of course, a simplification.

Clearly, a thin membrane beneath an acoustically transparent coating would have a velocity response proportional to the incident acoustic field. For array measurements up to an upper frequency limit of, say 60 kHz, the membrane thickness would need to be on the order of 1/10 of an inch (~2.5 mm).

Thicker plates may, however, be accommodated. Thicker elastic plates allow for transverse and in-plane vibrations, with the plate's mode shapes being primarily governed by flexure. For thin plates that do support bending motions, the wavenumbers corresponding to flexural modes are well separated and are outside of the wavenumbers within the acoustic region. Many signal processing techniques can be employed to adaptively filter the nonacoustic high-wavenumber components from the desired acoustic wavenumbers.

Figure 2:
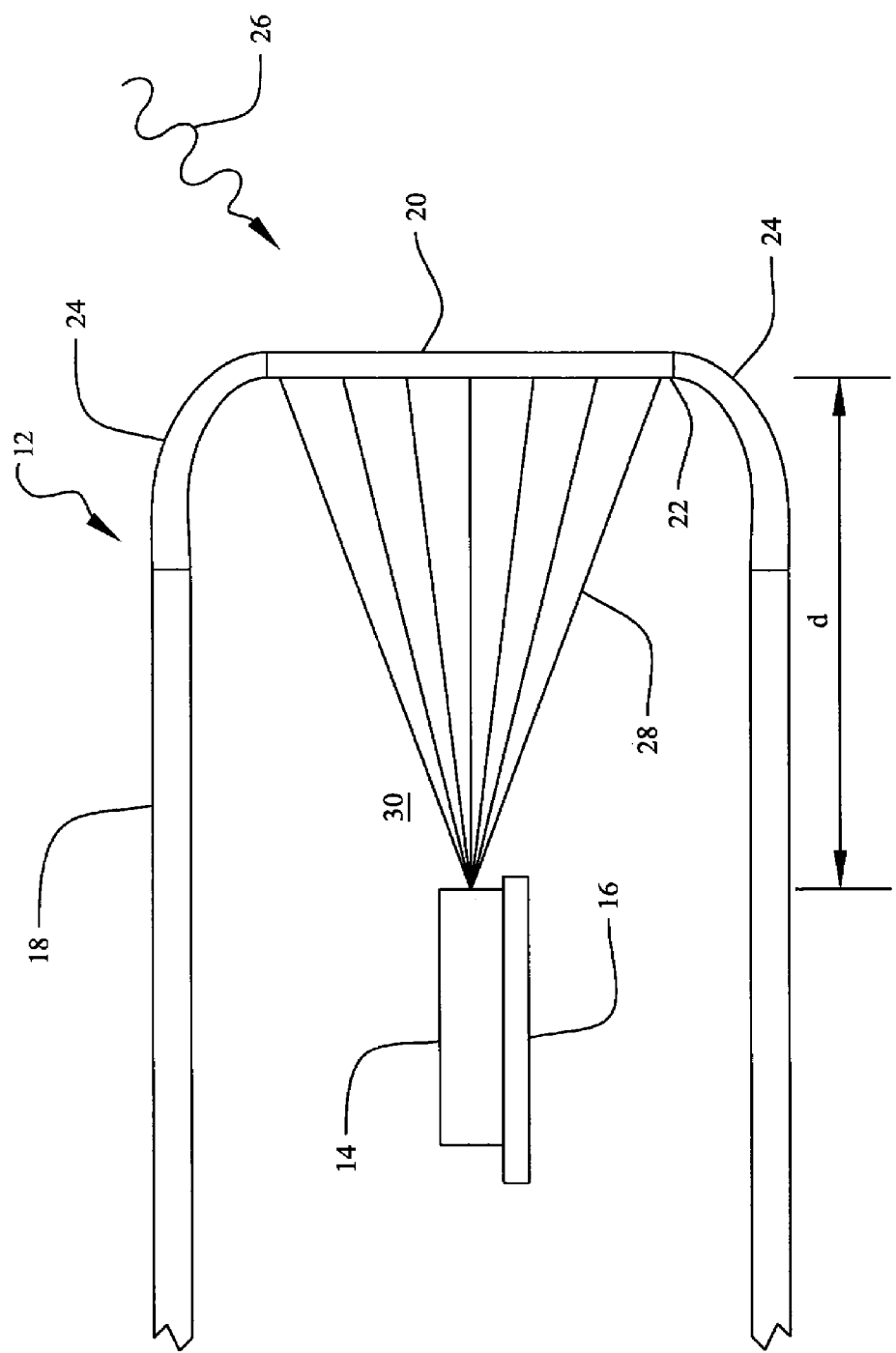
FIG. 2 is diagram of the sonar system of the current invention.

FIG. 2 illustrates the high-frequency laser sonar system 12 configured for a cylinder. This cylinder could be a nose of an underwater vehicle such as a torpedo. A scanning laser vibrometer system 14 is positioned on a vibration isolation member 16 within a cylinder 18. Cylinder 18 can be an underwater vehicle nose cone. An acoustic window 20 is positioned at a forward portion of cylinder 18. The inner surface of acoustic window 20 can have a reflective coating 22 positioned thereon. Acoustic window 20 is surrounded by vibration isolation material 24 where it joins cylinder 18. Scanning laser vibrometer 14 is located at a standoff distance "d" from the reflective coating 22 on the inner surface of acoustic window 20. A representative acoustic plane wave 26 is shown outside of the cylinder 18. Beams 28 from scanning laser vibrometer system 14 are shown within the cylinder 18.

The region 30 of cylinder 18 between vibrometer system 14 and reflective coating 22 is filled with a transparent, vibration decoupling medium. Preferably, this material is a gas that decouples vibrations from the underwater vehicle that could interfere with beams 28 and provide spurious signals. For these purposes, this material could also be a low pressure gas or vacuum.

Figure 3:
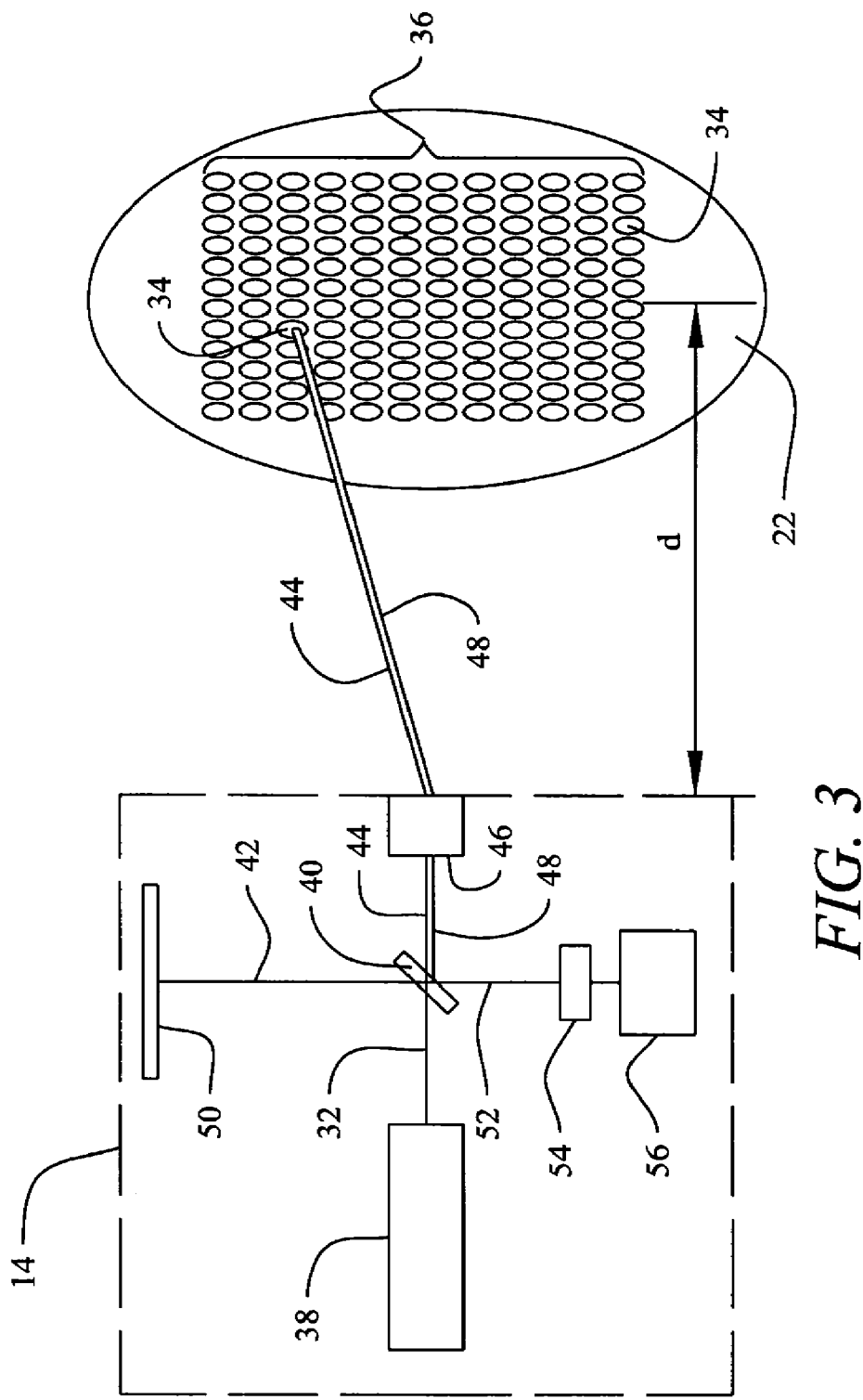
FIG. 3 is a diagram of the sonar system of the current invention showing the inner workings of the laser vibrometry system and further showing the virtual array capability of the invention.

FIG. 3 shows a virtual sensor array created when beams 28 from scanning laser vibrometer system 14 are reflected from reflective coating 22. Laser vibrometer system 14 uses at least one laser beam 32 to monitor the reflective coating 22 at a plurality of sensor locations 34. Although fewer are shown in FIG. 3, the current invention utilizes a 512×512 array of sensor locations 34 forming virtual sensor array 36; however, other numbers and configurations of sensor locations can be created within the scope of this invention.

The following provides a basic description of the laser vibrometer system 14 and virtual sensor array 36. A laser 38 within the laser vibrometer 14 provides laser beam 32 which is split by a splitter 40 into a reference portion 42 and a sensor portion 44. The sensor portion 44 travels through a scanning mirror 46 and is reflected off of the reflective coating 22 at sensor location 34. This results in a reflected portion 48 which returns to laser vibrometer system. Reference portion 42 is typically reflected off a reference mirror 50 and returns to splitter 40. The reflected portion 48 and the reference portion 42 are then combined at splitter 50. An interference beam 52 formed by interference between the two beam portions is received at a photodetector 54 which produces a signal representing the velocity of the reflective coating 22 at the sensor location 34. Either surface displacement (by counting interference fringes) or surface velocity (by detecting the Doppler shift due to the motion of the surface) can be measured by vibrometer system 14. In the preferred embodiment, surface velocity is used. An additional and known oscillator signal, at frequency $f_{rf}$, is added to the signal received by the photodetector. In this manner, the polarity or velocity direction can be determined. This allows monitoring of vibrations at each sensor location 34. A signal processing system 56 can then use these velocities to form acoustic beams as is well known in the art.

Scanning laser vibrometer system 14 can be similar to a commercially available system such as the Polytec® Model PSV-100 SLVS. This system features a velocity resolution down to 0.25 μm/s semipeak in a 1 Hz bandwidth, independent of frequency. However, for fast Fourier transform (FFT) temporal processing, the maximum sampling rate of the data acquisition system is 400 kHz (with a 2048 point FFT), which limits the upper frequency for two channel measurements to approximately 200 kHz. Voltage time signals can be taken directly if faster processing is necessary.

In the commercially available system, deflection mirrors, such as 46, automatically steer the helium-neon (He—Ne) laser beam (at a wavelength of 633 nm) within a 40°×40° (horizontal by vertical) field of view on to the vibrating surface. A simple geometry calculation determines the required standoff distance d for a field of view θ and a given aperture size L:

$$d = \frac{L}{2\tan\left(\frac{\theta}{2}\right)}. \tag{7}$$

Thus, a 40° scan would require a standoff distance of d=1.4 L. The scan resolution of the commercial SLVS is stated to be very precise at 0.01° (the corresponding point-to-point positional resolution would be determined from the surface-to-photodetector standoff distance). The normal component of velocity is always measured. For oblique angles of laser beam incidence, the system automatically compensates via a cosine correction.

It is to be understood that the foregoing description and specific embodiments are merely illustrative of the best mode of the invention and the principles thereof, and that various modifications and additions may be made to the invention by those skilled in the art, without departing from the spirit and scope of this invention, which is therefore understood to be limited only by the scope of the appended claims.

What is claimed is:

1. An acoustic sensing device comprising:
   a housing having an internal cavity filled with a vibration decoupling medium and a window aperture formed in said housing;
   an acoustic window mounted in the window aperture of said housing, said acoustic window being formed of an acoustically transparent material; and
   a scanning laser vibrometer positioned within said housing and capable of directing laser beams toward said acoustic window and said capable of reflecting said laser beams to detect vibrations of said acoustic window.

2. The device of claim 1 further comprising an antivibration window mounting joined to a periphery of the window aperture formed in said housing and positioned between said housing and said acoustic window.

3. The device of claim 2 wherein said vibration decoupling medium is a gas.

4. The device of claim 2 wherein said vibration decoupling medium is a vacuum.

5. The device of claim 1 wherein said acoustic window comprises a rigid plate.

6. The device of claim 1 wherein said acoustic window comprises a deformable membrane.

7. The device of claim 6 further comprising a signal processor joined to receive signals responsive to vibration from said scanning laser vibrometer, said signal processor processing said signals to remove affects of deflection of said acoustic window.

8. The device of claim 2 wherein said scanning laser vibrometer is capable of creating a virtual sensor array by detecting vibrations of said acoustic window at a plurality of locations.

9. The device of claim 8 further comprising a signal processor joined to receive signals responsive to vibration from said scanning laser vibrometer, said signal processor being capable of utilizing said signals for beamforming to establish the bearing to the origination of a signal source.

* * * * *